US008359150B2

(12) United States Patent
Kuze (10) Patent No.: US 8,359,150 B2
(45) Date of Patent: Jan. 22, 2013

(54) FOLLOWING DISTANCE CONTROL DEVICE AND FOLLOWING DISTANCE CONTROL METHOD

(75) Inventor: Yasuhiro Kuze, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 320 days.

(21) Appl. No.: 12/936,131

(22) PCT Filed: Mar. 30, 2009

(86) PCT No.: PCT/IB2009/005134
§ 371 (c)(1),
(2), (4) Date: Oct. 1, 2010

(87) PCT Pub. No.: WO2009/122262
PCT Pub. Date: Oct. 8, 2009

(65) Prior Publication Data
US 2011/0196591 A1    Aug. 11, 2011

(30) Foreign Application Priority Data
Apr. 1, 2008  (JP) ................................ 2008-095327

(51) Int. Cl.
*B60T 7/12* (2006.01)
(52) U.S. Cl. ............................. 701/96; 340/903; 342/70
(58) Field of Classification Search .................... 701/93, 701/96; 340/903; 342/70
See application file for complete search history.

(56) References Cited

U.S. PATENT DOCUMENTS

| 5,400,864 A | 3/1995 | Winner et al. |
| 8,103,424 B2 * | 1/2012 | Isaji et al. ........................ 701/96 |
| 2006/0152350 A1 | 7/2006 | Swoboda et al. |

FOREIGN PATENT DOCUMENTS
DE    10 2007 031 543    1/2009
(Continued)

OTHER PUBLICATIONS
International Search Report issued Jul. 2, 2009 in PCT/IB09/05134 filed Mar. 30, 2009.

(Continued)

*Primary Examiner* — Thomas Black
*Assistant Examiner* — Luke Huynh
(74) *Attorney, Agent, or Firm* — Oblon, Spivak, McClelland, Maier & Neustadt, L.L.P.

(57) ABSTRACT

A following distance control device (1) that controls a vehicle to regulate a distance to a preceding vehicle to a target following distance, the following distance control device (1) including: detecting unit (30) that detect at least one of acceleration operation (12) or deceleration operation (13) by a driver; a target following distance changing unit that changes the target following distance on the basis of the acceleration operation (12) or the deceleration operation (13) by the driver that is detected by the detecting unit (30); and an inhibition unit that inhibits a changing amount of the target following distance by the target following distance changing unit when the given acceleration operation (12) or the given deceleration operation (13) is executed.

6 Claims, 4 Drawing Sheets

FOREIGN PATENT DOCUMENTS

| | | |
|---|---|---|
| EP | 1 101 647 | 5/2001 |
| EP | 1 285 808 | 2/2003 |
| JP | 8 17000 | 1/1996 |
| JP | 9 290665 | 11/1997 |
| JP | 10-318009 | 12/1998 |
| JP | 2003-312308 | 11/2003 |
| JP | 2004 216964 | 8/2004 |
| JP | 2004 216965 | 8/2004 |
| JP | 2004-276640 | 10/2004 |
| JP | 2004 306690 | 11/2004 |
| JP | 2008-12951 | 1/2008 |

OTHER PUBLICATIONS

Office Action issued Aug. 25, 2010, in Japanese Patent Application No. 2008-095327, filed Apr. 1, 2008 (with partial English translation).

Written Opinion issued Jun. 11, 2010 in PCT/IB09/05134 filed Mar. 30, 2009.

Japanese Office Action issued Feb. 7, 2012, in Japan Patent Application No. 2010-014482 (with English translation).

\* cited by examiner

FOLLOWING DISTANCE CONTROL DEVICE AND FOLLOWING DISTANCE CONTROL METHOD

BACKGROUND OF THE INVENTION

1. Field of the Invention

The present invention relates to a following distance control device that controls a vehicle to regulate a distance to a preceding vehicle to a target following distance, and also relates to a following distance control method.

2. Description of the Related Art

A following distance control device executes various vehicle controls (throttle control, brake control, etc.) to regulate a distance to a preceding vehicle to a target following distance so that a subject vehicle travels at a speed relative to the preceding vehicle. In devices disclosed in Japanese Patent Application Publications No. 2004-216964 (JP-A-2004-216964) and No. 2004-216965 (JP-A-2004-216965), following distance control is cancelled when a driver starts brake operation or accelerator operation during the following distance control, and is resumed when the driver stops the above operation. Specifically, in these devices, when the following distance control is resumed, an actual following distance at the moment is used as the target following distance for the following distance control. Meanwhile, a device disclosed in Japanese Patent Application Publication No. 2004-306690 (JP-A-2004-306690) changes the target following distance when detecting the driver's intension to reduce or increase the following distance from accelerator operation or brake operation by the driver during the following distance control. For example, the driver's intension to reduce the following distance is detected from the accelerator operation with which the acceleration once reaches or exceeds the given acceleration and then is reduced. The driver's intension to increase the following distance is detected from the brake operation with which the deceleration exceeds given deceleration and from the subsequent accelerator operation to increase the acceleration.

However, during the following distance control, the driver may execute the brake operation or the accelerator operation that is irrespective of the following distance control for the purpose of the rapid deceleration to secure a safe following distance when a vehicle cuts in or for the purpose of the rapid acceleration for overtaking. In the above cases, if the target following distance is changed after the brake operation or the accelerator operation as by the devices disclosed in JP-A-2004-216964 and JP-A-2004-216965, the target following distance is changed to the one that is unintended by the driver. In addition, in the above cases, if the accelerator operation or the brake operation that exceeds the specified amount of acceleration or deceleration is detected as the driver's intention to change the following distance as by the device disclosed in JP-A-2004-306690, the target following distance is changed to the one that is unintended by the driver. Consequently, the driver may be disturbed by a need to change the following distance again to the originally intended following distance, for example.

SUMMARY OF THE INVENTION

In order to solve the above problem, the present invention provides a following distance control device that inhibits changing of a target following distance that is unintended by a driver and also provides a following distance control method.

A first aspect of the present invention is directed to a following distance control device that controls a vehicle to regulate a distance to a preceding vehicle to a target following distance, the following distance control device including: detecting unit that detect at least one of accelerator operation and brake operation by a driver; a target following distance changing unit that changes the target following distance on the basis of the accelerator operation or the brake operation by the driver that is detected by the detecting unit; and an inhibition unit that inhibits a changing amount of the target following distance by the target following distance changing unit when specified accelerator operation or specified brake operation is executed.

In the first aspect of the present invention, the inhibition unit may inhibit the changing amount of the target following distance by the target following distance changing unit when an acceleration operation amount that is detected by the detecting unit exceeds a threshold value of the acceleration operation amount, or when a deceleration operation amount that is detected by the detecting unit exceeds a threshold value of the deceleration operation amount.

In the following distance control device, the acceleration operation by the driver and/or the deceleration operation by the driver is detected by the detecting unit. Then, in the following distance control device, the following distance is changed by the following distance changing unit on the basis of the acceleration operation or the deceleration operation. As described above, when the target following distance is changed on the basis of the acceleration operation (that is, operation to reduce the following distance) or the deceleration operation (that is, operation to increase the following distance) by the driver, the driver gradually regulates the following distance to the desired target following distance. Thus, the driver executes the soft acceleration or deceleration operation. Meanwhile, in the case of overtaking or securing of the following distance when a vehicle cuts in, the driver has to execute the acceleration operation or the deceleration operation in accordance with the situation. Thus, the driver executes the strong acceleration or deceleration operation. When the acceleration operation or the deceleration operation as described above is executed, the driver has no intention to change the target following distance. Therefore, when the acceleration operation amount exceeds the threshold value thereof, or when the deceleration operation amount exceeds the threshold value thereof, the changing amount of the target following distance on the basis of the acceleration operation or the deceleration operation is inhibited. The threshold value of the acceleration operation amount is set to determine whether or not the relatively strong acceleration operation is executed by the driver who has no intention to change the target following distance. The threshold value of the deceleration operation amount is set to determine whether or not the relatively strong deceleration operation is executed by the driver who has no intention to change the target following distance. As described above, in the following distance control device, the changing amount of the target following distance can be inhibited when the driver executes the acceleration operation or the deceleration operation without any intention to change the target following distance. Therefore, it is possible to inhibit the changing amount of the target following distance that is unintended by the driver. In addition, in the following distance control device, when the driver executes the acceleration operation or the deceleration operation with the intention to change the target following distance, the target following distance is changed on the basis of the acceleration operation or the deceleration operation. Therefore, it is possible to change the target following distance to the one that is intended by the driver.

Here, when the detecting unit detect the acceleration operation by the driver, the detecting unit may detect operation of an accelerator pedal by the driver or a parameter such as a degree of throttle opening or the acceleration that corresponds to the accelerator pedal operation. Meanwhile, when the detecting unit detect the deceleration operation by the driver, the detecting unit may detect operation of a brake pedal by the driver or a parameter such as brake hydraulic pressure or the deceleration that corresponds to the brake pedal operation. The ways to inhibit changing of the target following distance include, for example, to prohibit changing of the target following distance and to change the target following distance to the one between the originally set target following distance and the newly set target following distance.

In the first aspect of the present invention, the inhibition unit may inhibit the changing amount of the target following distance by the target following distance changing unit when the distance to the preceding vehicle after the acceleration or deceleration operation by the driver that is detected by the detecting unit exceeds the maximum value of the following distance or falls below the minimum value of the following distance.

In the following distance control device, the detecting unit detect the acceleration operation by the driver and/or the deceleration operation by the driver. Then, in the following distance control device, the target following distance is changed by the following distance changing unit on the basis of the acceleration operation or the deceleration operation. When the following distance is excessively reduced (when a subject vehicle gets too close to the preceding vehicle), or when the following distance is excessively increased (when the subject vehicle gets too far from the preceding vehicle), it should be understood that the driver has no intention to follow the preceding vehicle while maintaining the newly obtained following distance. Therefore, in the following distance control device, when the distance to the preceding vehicle after the acceleration operation or the deceleration operation by the driver exceeds the maximum value of the following distance or falls below the minimum value of the following distance, the changing amount of the target following distance on the basis of the acceleration operation or the deceleration operation is inhibited. The maximum value of the following distance is a threshold value that is used to determine that the following distance is increased to such an extent that the driver has no intention to change the target following distance. The minimum value of the following distance is a threshold value that is used to determine that the following distance is reduced to such an extent that the driver has no intention to change the target following distance. As described above, in the following distance control device, the changing amount of the target following distance is inhibited when the following distance is either reduced or increased by the acceleration operation or the deceleration operation to such an extent that the driver has no intention to change the target following distance. Therefore, it is possible to inhibit the changing amount of the target following distance that is unintended by the driver. In addition, in the following distance control device, when the following distance is either reduced or increased by the acceleration operation or the deceleration operation by the driver within such a range that the driver has the intention to change the target following distance, the target following distance is changed to the one that corresponds to the magnitude of the acceleration operation or the deceleration operation. Therefore, it is possible to change the target following distance to the one that is intended by the driver.

A second aspect of the present invention is directed to a following distance control method of controlling a vehicle to regulate a distance to a preceding vehicle to a target following distance, the following distance control method including: detecting at least one of acceleration operation and deceleration operation by a driver; changing the target following distance on the basis of the detected acceleration operation or the detected deceleration operation by the driver; and inhibiting a changing amount of the target following distance when a specified acceleration operation or a specified deceleration operation is executed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

According to an embodiment of the present invention, when acceleration operation or deceleration operation is executed by a driver who has no intention to change a target following distance, it is possible to prevent changing of the target following distance that is unintended by the driver by inhibiting a changing amount of the target following distance.

Description will hereinafter be made on a following distance control device according to the embodiment with reference to the drawings.

The following distance control device according to the embodiment is applied to an Adaptive Cruise Control system (ACC system) that is installed in a vehicle. The ACC system according to the embodiment executes preceding vehicle follow-up control to regulate a distance to a preceding vehicle to a target following distance when there is a preceding vehicle, and executes constant speed control to regulate a subject vehicle speed to a target vehicle speed when there is no preceding vehicle.

Figure 1:
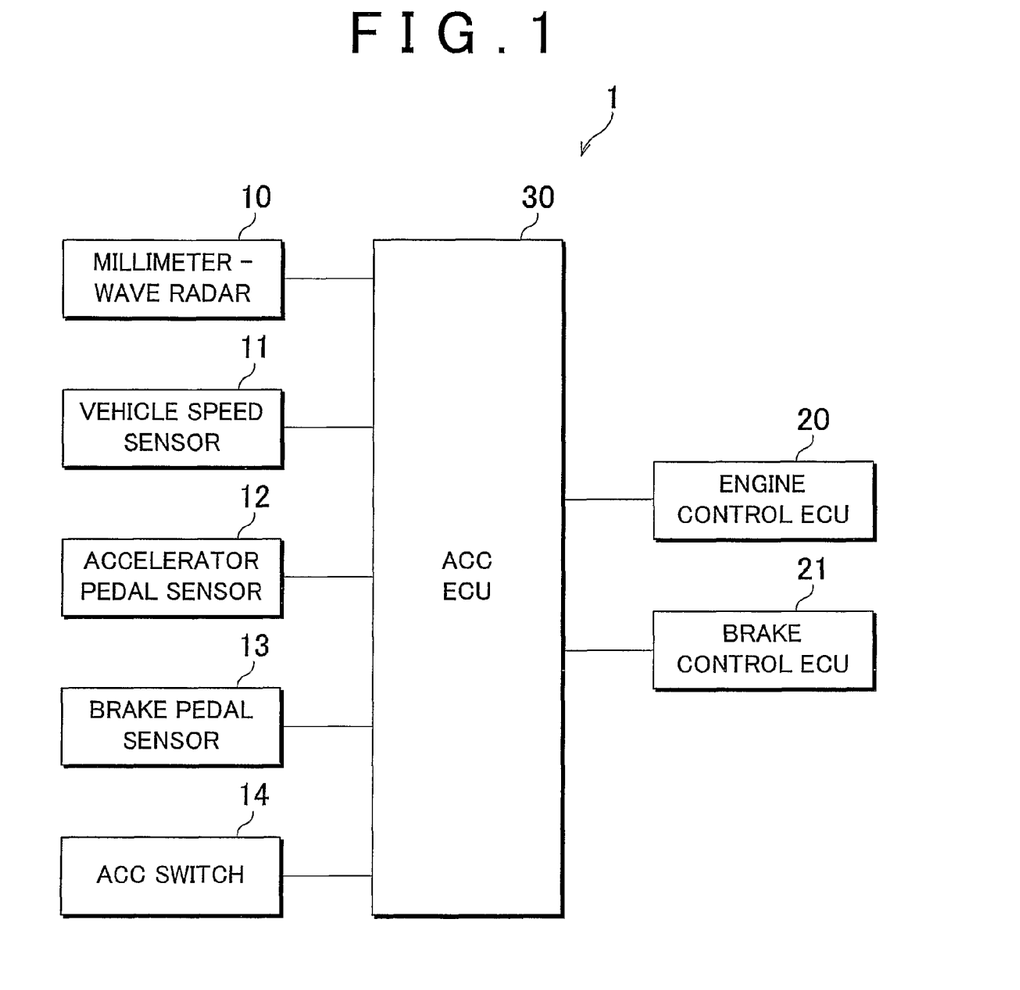
FIG. 1 is a configuration diagram of an ACC system according to an embodiment of the present invention.
Figure 2:
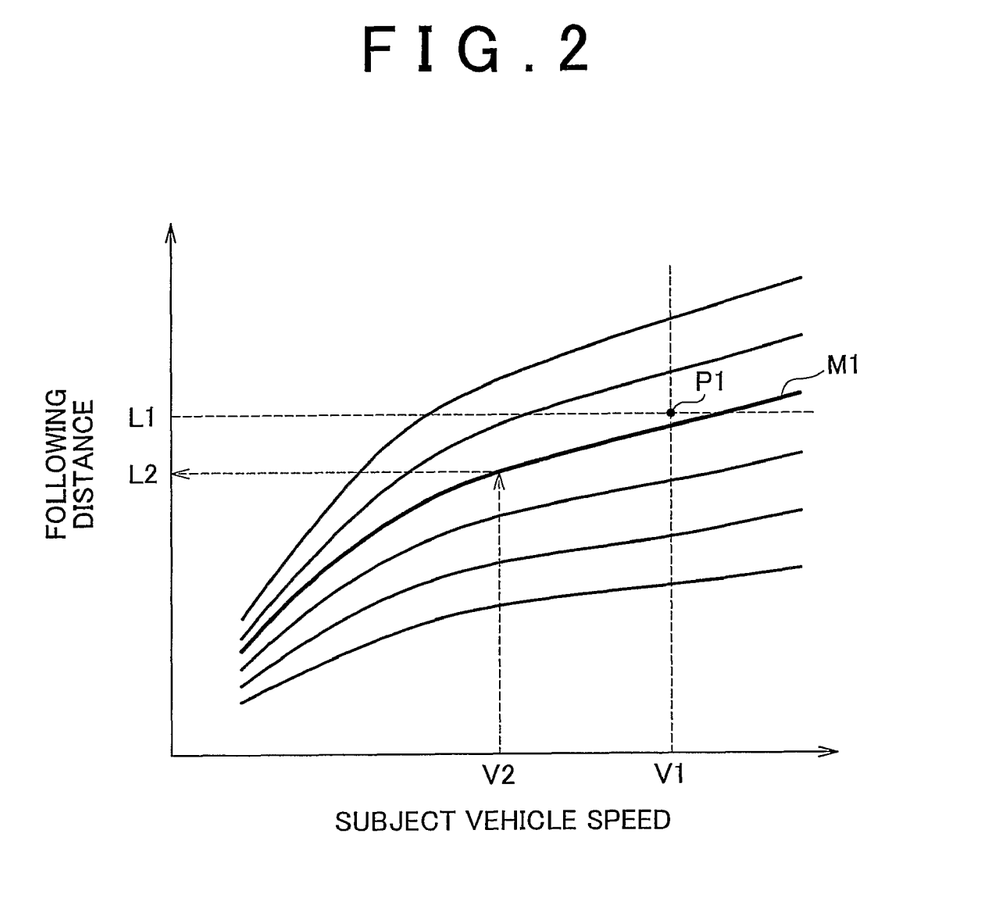
FIG. 2 is examples of target following distance maps used in an ECU in FIG. 1.

Description is now made on an ACC system 1 according to the embodiment with reference to FIG. 1 and FIG. 2. FIG. 1 is a configuration diagram of the ACC system according to the embodiment. FIG. 2 is examples of target following distance maps used in an ACC ECU in FIG. 1.

During the preceding vehicle follow-up control, the ACC system 1 executes vehicle speed control on the basis of the target following distance that is extracted from a target following distance map in accordance with the subject vehicle speed. In addition, the ACC system 1 changes the target following distance map on the basis of the following distance and the subject vehicle speed that correspond to the accelerator operation or the brake operation by the driver. Especially when the ACC system 1 determines that the accelerator operation or the brake operation by the driver is not intended to change the target following distance, the ACC system 1 prohibits changing of the target following distance map so as not to change the target following distance to the one that is unintended by the driver.

The ACC system 1 includes a millimeter-wave radar 10, a vehicle speed sensor 11, an accelerator pedal sensor 12, a brake pedal sensor 13, an ACC switch 14, an engine control ECU (Electronic Control Unit) 20, a brake control ECU 21, and an ACC ECU 30.

In this embodiment, the accelerator pedal sensor 12 and processing by the ACC ECU 30 function as an acceleration operation detecting unit, the vehicle speed sensor 11, the brake pedal sensor 13, and processing by the ACC ECU 30 functions as a deceleration operation detecting unit, and processing by the ACC ECU 30 functions as a target following distance changing unit.

The millimeter-wave radar 10 uses a millimeter wave to detect an object. The millimeter-wave radar 10 is installed in the front center of the subject vehicle. The millimeter-radar 10 transmits the millimeter waves to scan within a horizontal surface from the subject vehicle to the front, and receives the reflected millimeter waves. Then, the millimeter-wave radar 10 transmits transmitted/received information that is obtained from the millimeter waves as a radar signal to the ACC ECU 30.

The vehicle sensor 11 is a wheel speed sensor to detect a rotational speed of a wheel. The vehicle sensor 11 transmits the rotational speed as a vehicle speed signal to the ACC ECU 30 and the like. Then, the ACC ECU 30 computes the subject vehicle speed from the rotational speed of the wheel. Furthermore, the ACC ECU 30 computes acceleration and deceleration from a change in the subject vehicle speed over time. The acceleration (deceleration) may be detected by an acceleration sensor.

The accelerator pedal sensor 12 detects an depression amount (accelerator operation amount) of an accelerator pedal (not shown). The accelerator pedal sensor 12 transmits the detected depression amount as an accelerator pedal signal to the ACC ECU 30 and the like.

The brake pedal sensor 13 detects a depression amount of a brake pedal (not shown). The brake pedal sensor 13 transmits the detected depression amount as a brake pedal signal to the ACC ECU 30 and the like.

The ACC switch 14 is to turn on (activate)/off (deactivate) the ACC system 1. The ACC switch 14 transmits information on its operation by the driver to the ACC ECU 30 as an ACC switch signal.

The engine control ECU 20 controls an engine (driving force). In the engine control ECU 20, the target acceleration is set on the basis of the accelerator operation by the driver and the like. Also in the engine control ECU 20, a target operation amount of a throttle valve is set to achieve the target acceleration, and the target operation amount is transmitted as a target throttle operation amount signal to a throttle actuator (not shown). Specifically, when the engine control ECU 20 receives an engine control signal from the ACC ECU 30, the engine control ECU 20 transmits the target throttle valve operation amount signal to the throttle actuator to achieve the target acceleration that is provided in the engine control signal.

The throttle actuator adjusts the operation amount of the throttle valve (not shown). The throttle actuator is activated by responding to the target throttle valve operation amount signal from the engine control ECU 20 and adjusts the operation amount of the throttle valve. Once the target throttle valve operation amount is achieved, the vehicle gains the target acceleration that is set in the engine control ECU 20, and thus travels at the target vehicle speed.

The brake control ECU 21 controls each of wheel brakes (braking force). In the brake control ECU 21, target deceleration is set on the basis of the brake operation by the driver and the like. Also in the brake control ECU 21, brake hydraulic pressure in a wheel cylinder (not shown) for each of the wheels is set to achieve the target deceleration, and the brake hydraulic pressure is transmitted as a target hydraulic pressure signal to a brake actuator (not shown). Specifically, when the brake control ECU 21 receives a brake control signal from the ACC ECU 30, the brake control ECU 21 transmits the target hydraulic pressure signal to the brake actuator to achieve the target deceleration that is indicated in the brake control signal.

The brake actuator adjusts the brake hydraulic pressure in the wheel cylinder for each of the wheels. The brake actuator is activated by responding to the target hydraulic pressure signal from the brake control ECU 21 and adjusts the brake hydraulic pressure in the wheel cylinder. Once the target hydraulic pressure is achieved, the vehicle gains the target deceleration that is set in the brake control ECU 21, and thus travels at the target vehicle speed.

The ACC ECU 30 is an Electronic Control Unit that includes a Central Processing Unit (CPU), a Read Only Memory (ROM), a Random Access Memory (RAM) and the like, and executes overall control of the ACC system 1. The ACC ECU 30 activates the ACC system 1 on the basis of the ACC switch signal from the ACC switch 14 when the driver turns on the ACC switch 14, and deactivates the ACC system 1 when the driver turns off the ACC switch 14 during the operation of the ACC system 1.

While the ACC system 1 is in operation, the ACC ECU 30 receives various signals from various sensors 10, 11, 12, 13, and executes preceding vehicle determination control, the preceding vehicle follow-up control, the constant speed control, the target following distance map changing control, etc. Also in the ACC ECU 30, the target acceleration/deceleration are set, and a control signal is transmitted to the engine control ECU 20 or the brake control ECU 21 on the basis of the target acceleration or the target deceleration, respectively. Here, the target acceleration/deceleration is indicated by a positive/ negative value. When the value is positive, it is the target acceleration for acceleration control (driving force control). When the value is negative, it is the target deceleration for deceleration control (braking force control).

The ROM in the ACC ECU 30 stores the target following distance maps used for the preceding vehicle follow-up control. As shown in FIG. 2, the target following distance maps indicate the following distance that corresponds to the subject vehicle speed (target following distance). In the maps, as the subject vehicle speed increases, the longer following distance is set. The target following distance maps are available in plural stages to set a plurality of target following distances for a single subject vehicle speed so as for the driver to set the desired target following distance. One target following distance map that is the closest to an intersection of the actual subject vehicle speed with the actual following distance is selected from the plural target following distance maps. For example, when the subject vehicle speed is V1 and the following distance is L1 upon activation of the ACC system 1, a target following distance map M1, which is the closest to an intersection P1 of the subject vehicle speed V1 with the following distance L1, is selected. Then, when the vehicle speed is changed to V2 during the preceding vehicle follow-up control, the target following distance L2 is extracted from the target following distance map M1.

Now, description is made on the preceding vehicle determination control. Based on the radar signal from the millimeter-wave radar 10, the ACC ECU 30 determines at regular time intervals if there is a vehicle ahead of the subject vehicle. At this time, a traveling direction of the subject vehicle is assumed in accordance with a steering angle, a yaw rate, and the like, and the presence or absence of a preceding vehicle is determined in consideration of the traveling direction of the subject vehicle. If there is a preceding vehicle, the ACC ECU 30 computes a distance between the subject vehicle and the preceding vehicle on the basis of the radar signal at regular time intervals.

Now, description is made on the preceding vehicle follow-up control. If there is a preceding vehicle, the ACC ECU 30 extracts the target following distance, which corresponds to the subject vehicle speed, from the selected target following distance map at regular time intervals. Then, the ACC ECU 30 sets the target acceleration/deceleration that is required to regulate the distance to the preceding vehicle to the target following distance on the basis of a difference between the distance to the preceding vehicle and the target following distance at regular time intervals. When the target acceleration/deceleration is a positive value, the ACC ECU 30 sets the target acceleration and transmits the target acceleration as the engine control signal to the engine control ECU 20. When the target acceleration/deceleration is a negative value, the ACC ECU 30 sets the target deceleration and transmits the target deceleration as the brake control signal to the engine control ECU 21.

Now, description is made on the constant speed control. If there is no preceding vehicle, the ACC ECU 30 sets the target acceleration/deceleration that is required to regulate the subject vehicle speed to the target vehicle speed on the basis of a difference between the subject vehicle speed and the target vehicle speed at regular time intervals. When the target acceleration/deceleration is a positive value, the ACC ECU 30 sets the target acceleration and transmits the target acceleration as the engine control signal to the engine control ECU 20. When the target acceleration/deceleration is a negative value, the ACC ECU 30 sets the target deceleration and transmits the target deceleration as the brake control signal to the brake control ECU 21. The driver may set the target vehicle speed through a function provided in the ACC switch 14, for example, or the subject vehicle speed upon activation of the ACC system 1 may be set as the target vehicle speed.

Description is now made on the target following distance map changing control. There are two cases that the target following distance control map is changed: a case that the following distance is reduced by accelerator operation, and a case that the following distance is increased by the brake operation. These two cases by the accelerator operation and the brake operation will be described below in sequence.

Description is now made on the accelerator operation. Basically, when the accelerator operation (that is, operation to reduce the following distance by acceleration) is executed by the driver, the target following distance map is changed to the one that corresponds to the actual following distance and the actual subject vehicle speed immediately after the completion of the accelerator operation. At this time, if the accelerator operation is executed to a large extent by the driver who has no intention to adjust the target following distance, or if the following distance is reduced to such an extent that the driver has no intention to adjust the target following distance, the target following distance map is not changed. When the driver adjusts the target following distance by the accelerator operation, the driver gradually reduces the following distance until the following distance becomes the desired following distance. Thus, the driver does not execute the accelerator operation to a large extent (the relatively rapid acceleration) as overtaking. In addition, when the subject vehicle follows the preceding vehicle, an adequate following distance is secured. Therefore, when the driver adjusts the target following distance, the target following distance is not changed to such an extent that the subject vehicle gets too close to the preceding vehicle.

Specifically, it is determined at regular time intervals in the ACC ECU 30 whether or not the accelerator pedal is depressed (whether or not the accelerator is actuated) on the basis of the accelerator pedal signal during the preceding vehicle follow-up control. When the accelerator is actuated, it is determined at regular time intervals in the ACC ECU 30 whether or not a maximum value of the accelerator operation amount is updated on the basis of the accelerator pedal signal. If the maximum value of the accelerator pedal operation amount is updated, the maximum value is stored in the ACC ECU 30. In addition, when the accelerator is actuated, it is determined at regular time intervals in the ACC ECU 30 whether or not depression of the accelerator pedal is stopped (whether or not the accelerator is de-actuated) on the basis of the accelerator pedal signal.

When the accelerator is de-actuated, it is determined in the ACC ECU 30 whether or not the stored maximum value of the accelerator operation amount is larger than a threshold value A. The threshold value A is set in advance by an experiment and the like to detect the relatively heavy accelerator operation with which the driver has no intention to change the target following distance (for example, the accelerator operation that is necessary for the subject vehicle to accelerate for overtaking). The threshold value A may be a variable that corresponds to the subject vehicle speed by using a map and the like. If the maximum value of the accelerator operation amount is larger than the threshold value A, it is determined that the accelerator operation is not executed with the intention to adjust the target following distance. Therefore, the target following distance map is not changed in the ACC ECU 30.

If the maximum value of the accelerator operation amount is equal to or smaller than the threshold value A, it is determined in the ACC ECU 30 whether or not the following distance immediately after the completion of the accelerator operation is larger than a threshold value B and smaller than a threshold value C. The threshold value B is set in advance by an experiment and the like to determine whether or not the following distance is reduced to a large extent by the driver with no intention to adjust the target following distance (the following distance is reduced to such an extent that the subject vehicle is too close to the preceding vehicle). The threshold value C is set in advance by an experiment and the like to determine whether or not the following distance is increased to a large extent by the driver with no intention to adjust the target following distance (the following distance is increased to such an extent that the subject vehicle is too far away from the preceding vehicle). The threshold value B and the threshold value C may be variables that correspond to the subject vehicle speed by using a map and the like. When the following distance immediately after the completion of the accelerator operation is equal to or smaller than the threshold value B or is equal to or larger than the threshold value C, it is determined that the accelerator operation is executed without any intention to adjust the target following distance. Therefore, the target following distance map is not changed in the ACC ECU 30. At this time, because it is considered that the following distance is reduced by the accelerator operation, it may only be determined whether or not the following distance immediately after the completion of the accelerator operation is larger than the threshold value B.

When the maximum value of the accelerator operation amount is equal to or smaller than the threshold value A, and when the following distance immediately after the completion of the accelerator operation is larger than the threshold value B and smaller than the threshold value C, it is determined that the accelerator operation is executed with the intension of the driver to adjust the target following distance. Consequently, in the ACC ECU 30, the target following distance map, which is the closest to the intersection of the actual following distance with the actual subject vehicle speed immediately after the completion of the accelerator operation, is selected.

Description is now made on the brake operation. Basically, when the brake operation (that is, operation to increase the following distance by deceleration) is executed, the target following distance map is changed to the one that corresponds to the actual following distance and the actual vehicle speed immediately after the completion of the brake operation. At this time, if the brake operation is executed to a large extent by the driver with no intention to adjust the target following distance (large deceleration), or if the following distance is increased to such a degree that the driver has no intention to adjust the target following distance, the target following distance map is not changed. When the driver adjusts the target following distance by the brake operation, the driver gradually increases the following distance until the following distance becomes the desired following distance. Thus, the brake operation to a large extent (the relatively rapid deceleration) is not executed as in a case that it is necessary to secure a sufficient following distance when a vehicle cuts in. In addition, when the subject vehicle follows the preceding vehicle, an adequate following distance is secured. Therefore, when the driver adjusts the target following distance, the target following distance is not changed to such an extent that the subject vehicle becomes too far away from the preceding vehicle.

Specifically, it is determined at regular time intervals in the ACC ECU 30 whether or not the brake pedal is depressed (whether or not the brakes are actuated) on the basis of the brake pedal signal during the preceding vehicle follow-up control. When the brakes are actuated, it is determined at regular time intervals in the ACC ECU 30 whether or not a maximum deceleration value is updated. If the maximum deceleration value is updated, the maximum value is stored in the ACC ECU 30. In addition, when the brakes are actuated, it is determined at regular time intervals in the ACC ECU 30 whether or not depression of the brake pedal is stopped (whether or not the brakes are de-actuated) on the basis of the brake pedal signal.

When the brakes are de-actuated, it is determined in the ACC ECU 30 whether or not the stored maximum deceleration value is larger than a threshold value D. The threshold value D is set in advance by an experiment and the like to detect the large deceleration that corresponds to the relatively heavy brake operation by the driver with no intension to change the target following distance (for example, the deceleration to secure a sufficient following distance when a vehicle cuts in). The threshold value D may be a variable that corresponds to the subject vehicle speed by using a map and the like. If the maximum deceleration value is larger than the threshold value D, it is determined that the brake operation (deceleration) is not intended for the adjustment of the target following distance. Therefore, the target following distance map is not changed in the ACC ECU 30.

If the maximum deceleration value is equal to or smaller than the threshold value D, it is determined in the ACC ECU 30 whether or not the following distance immediately after the completion of the brake operation is larger than the threshold value B and smaller than the threshold value C. When the following distance immediately after the completion of the brake operation is equal to or smaller than the threshold value B or is equal to or larger than the threshold value C, it is determined that the brake operation is not intended for the adjustment of the target following distance. Therefore, the target following distance map is not changed in the ACC ECU 30. At this time, because it is considered that the following distance is increased by the brake operation, it may only be determined here whether or not the following distance immediately after the completion of the brake operation is smaller than the threshold value C.

When the maximum deceleration value is equal to or smaller than the threshold value D, and the following distance immediately after the completion of the brake operation is larger than the threshold value B and smaller than the threshold value C, it is determined that the brake operation is intended to adjust the target following distance. Consequently, the target following distance map, which is the closest to the intersection of the actual following distance with the actual subject vehicle speed immediately after the completion of the brake operation, is selected in the ACC ECU 30.

Figure 3:
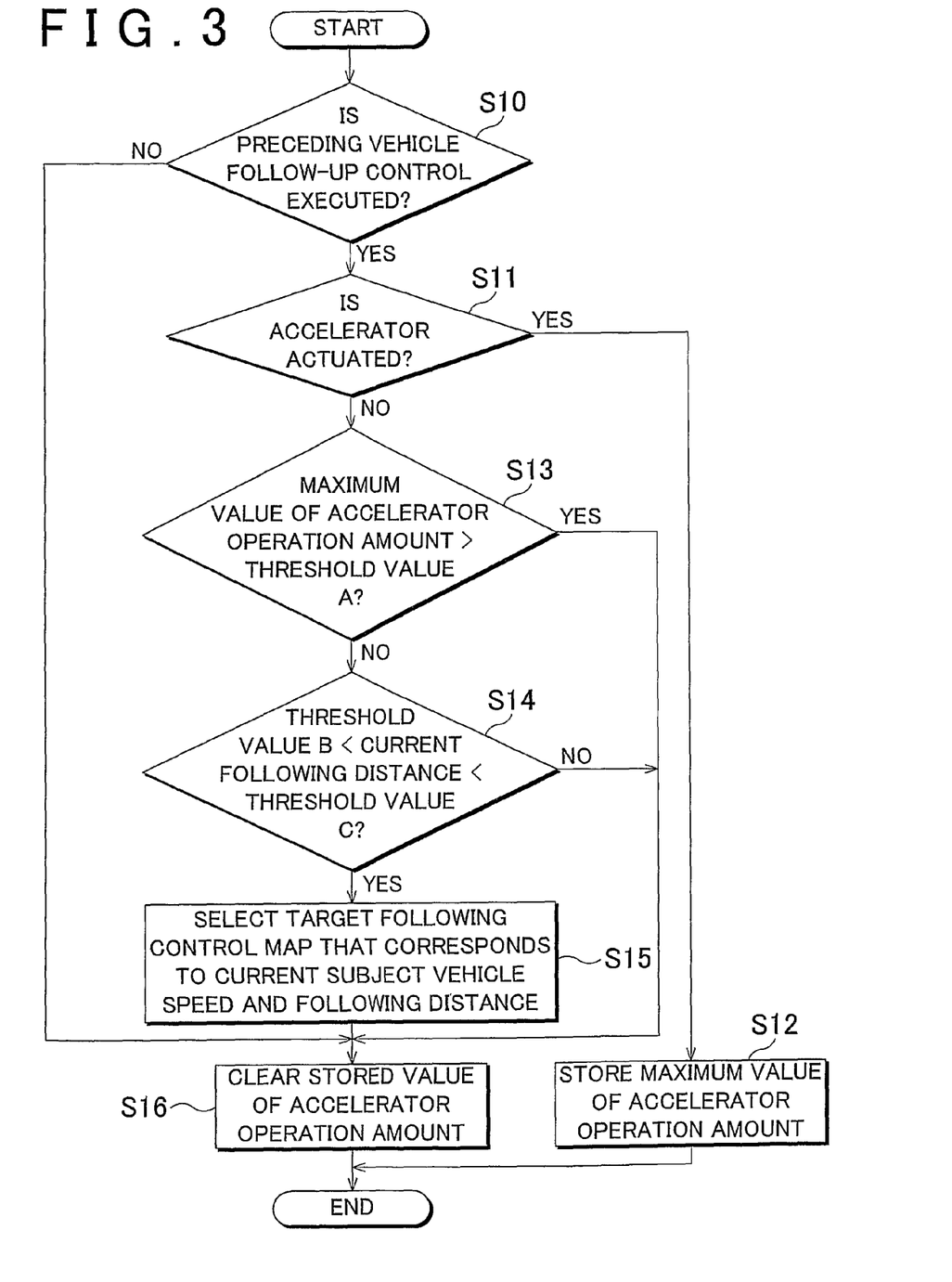
FIG. 3 is a flow chart showing the flow of target following distance map changing control that is executed in the ECU in FIG. 1 upon accelerator operation.
Figure 4:
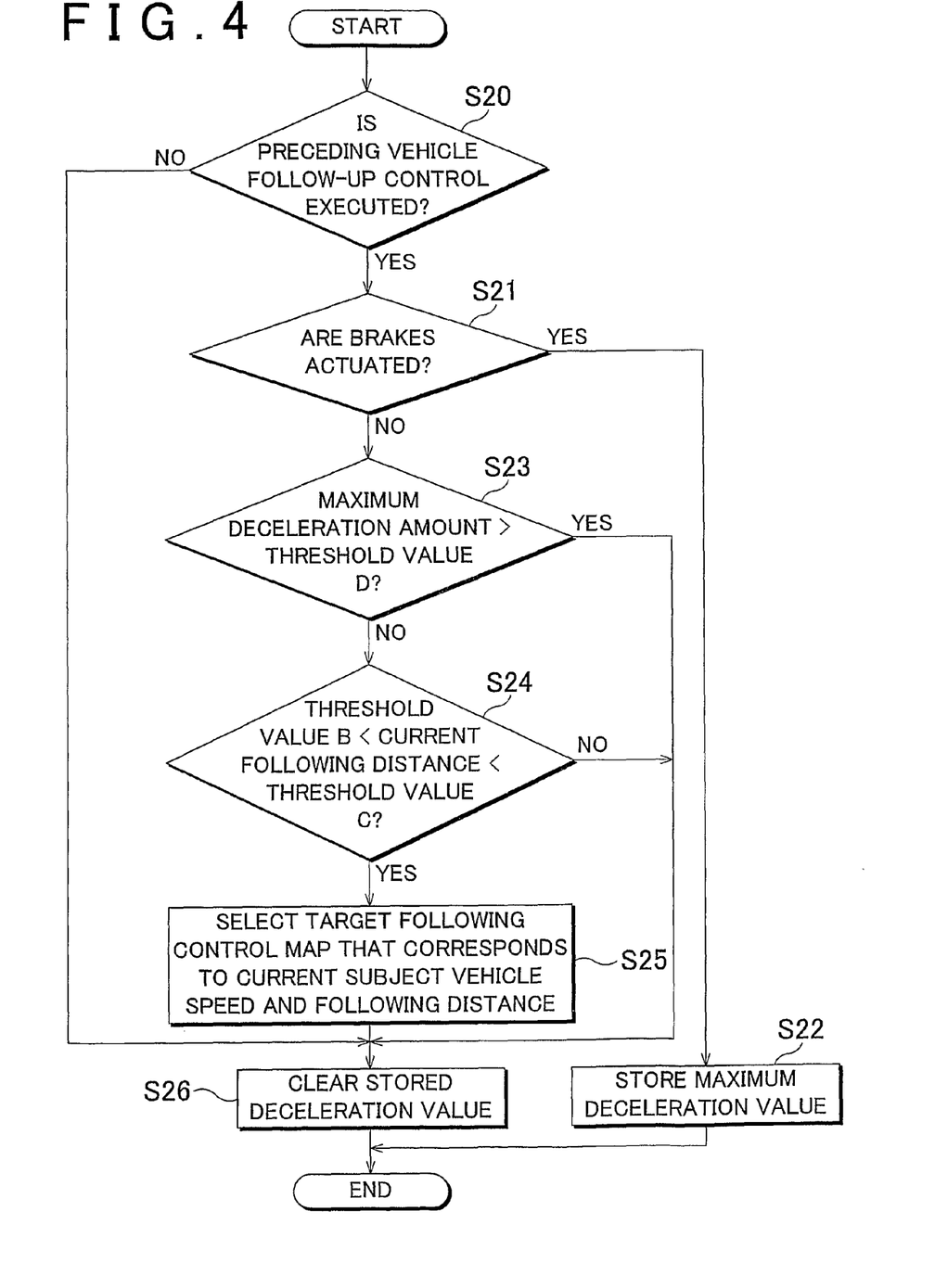
FIG. 4 is a flow chart showing the flow of target following distance map changing control that is executed in the ECU in FIG. 1 upon brake operation.

Referring now to FIG. 1 and FIG. 2, operations in the ACC system 1 are described. The target following map changing control in the ACC ECU 30 is described by following the flow charts shown in FIG. 3 and FIG. 4. FIG. 3 is a flow chart showing the flow of the target following distance map changing control that is executed in the ACC ECU 30 in FIG. 1 upon the accelerator operation. FIG. 4 is a flow chart showing the flow of the target following distance map changing control that is executed in ACC ECU 30 in FIG. 1 upon the brake operation.

The ACC switch 14 transmits the information of its operation by the driver to the ACC ECU 30 as the ACC switch signal. If it is determined that the driver has turned on the ACC switch 14 based on the ACC switch signal, the ACC ECU 30 activates the ACC system 1 to start various controls.

The millimeter-wave radar 10 transmits and receives the millimeter waves, and transmits the transmitted and received information to the ACC ECU 30 as the radar signal. The vehicle speed sensor 11 detects the rotational speed of the wheel, and transmits the rotational speed to the ACC ECU 30 as the vehicle speed signal. The accelerator pedal sensor 12 detects the depression amount of the accelerator pedal, and transmits the detected depression amount to the ACC ECU 30 as the accelerator pedal signal. The brake pedal sensor 13 detects the depression amount of the brake pedal, and transmits the detected depression amount to the ACC ECU 30 as the brake pedal signal.

The ACC ECU 30 receives various signals from the sensors 10, 11, 12, 13 at regular time intervals. Then, it is determined in the ACC ECU 30 the presence or the absence of a preceding vehicle based on the radar signal, and if there is a preceding vehicle, the distance to the preceding vehicle is computed. In addition, in the ACC ECU 30, the subject vehicle speed and the deceleration are computed based on the vehicle speed signal. When the ACC system 1 is activated, a target following distance map is selected in the ACC ECU 30 in accordance with the intersection of the following distance with the subject vehicle speed at the time of the activation. However, because the following distance is not computed when there is no preceding vehicle, the target following distance map is not selected.

When there is a preceding vehicle, the target following distance, which corresponds to the subject vehicle speed, is retrieved from the target following distance map at regular time intervals in the ACC ECU 30 by the preceding vehicle follow-up control. Then, the target acceleration/deceleration that is required to regulate the following distance to the target following distance is set. When the target acceleration/deceleration is a positive value, the ACC ECU 30 transmits the engine control signal, which indicates the target acceleration, to the engine control ECU 20. Upon receipt of the engine control signal, the engine control ECU 20 transmits the target throttle operation amount signal to the throttle actuator to achieve the target acceleration that is provided in the engine control signal. Upon receipt of the target throttle operation amount signal, the throttle actuator is actuated in accordance with the target throttle operation amount signal to adjust a degree of opening of a throttle valve. Once the target throttle operation amount is achieved, the subject vehicle obtains the target acceleration and thus the target vehicle speed. Meanwhile, when the target acceleration/deceleration is a negative value, the ACC ECU 30 transmits the brake control signal, which indicates the target deceleration, to the engine control ECU 21. Upon receipt of the brake control signal, the brake control ECU 21 transmits the target hydraulic pressure signal to the brake actuator to achieve the target deceleration that is provided in the brake control signal. Upon receipt of the target hydraulic pressure signal, the brake actuator is actuated in accordance with the target hydraulic pressure signal and adjusts the brake hydraulic pressure in the wheel cylinder. Once the target hydraulic pressure is achieved, the subject vehicle obtains the target deceleration and thus the target vehicle speed. Therefore, the distance to the preceding vehicle is adjusted to become the target following distance in the subject vehicle.

When there is no preceding vehicle, the target acceleration/deceleration that is required to regulate the subject vehicle speed to the target vehicle speed is set at regular time intervals in the ACC ECU 30 by the constant speed control. Based on the target acceleration/deceleration, the same operations as the above-mentioned operations for the preceding vehicle follow-up control are executed in the engine control ECU 20 (throttle actuator, throttle valve) and the brake control ECU 21 (brake actuator, wheel cylinder). Therefore, the subject vehicle speed is adjusted to become the target vehicle speed in the subject vehicle.

In the ACC ECU 30, it is determined whether or not the preceding vehicle follow-up control is executed at regular time intervals (S10). If it is determined in S10 that the preceding vehicle follow-up control is not executed, a stored value of the accelerator operation amount in the ACC ECU 30 is cleared, if there is any (S16), and the current processing is terminated.

If it is determined in S10 that the preceding vehicle follow-up control is executed, it is determined in the ACC ECU 30 whether or not the accelerator is actuated on the basis of the accelerator pedal signal (S11). If it is determined in S11 that the accelerator is actuated, the maximum value of the accelerator operation amount is stored in the ACC ECU 30 in a case that the maximum value thereof is updated on the basis of the accelerator pedal signal (S12), and the current processing is terminated.

If it is determined in S11 that the accelerator is de-actuated, it is determined in the ACC ECU 30 whether or not the stored maximum value of the accelerator operation amount is larger than the threshold value A (S13). If it is determined in S13 that the maximum value of the accelerator operation amount is larger than the threshold value A, the stored value of the accelerator operation amount is cleared in the ACC ECU 30 (S16), and the current processing is terminated. In this case, the target following distance map, which is originally selected, is maintained.

If it is determined in S13 that the maximum value of the accelerator operation amount is equal to or smaller than the threshold value A, it is determined in the ACC ECU 30 whether or not the current following distance is larger than the threshold value B and is smaller than the threshold value C (S14). If it is determined in S14 that the current following distance is equal to or smaller than the threshold value B or equal to or larger than the threshold value C, the stored value of the accelerator operation amount is cleared in the ACC ECU 30 (S16), and the current processing is terminated. In this case, the target following distance map, which is originally selected, is maintained.

If it is determined in S14 that the current following distance is larger than the threshold value B and smaller than the threshold value C, the target following distance map, which corresponds to the current following distance and the current subject vehicle speed, is selected in the ACC ECU 30 (S15). Then, the stored value of the accelerator operation amount is cleared in the ACC ECU 30 (S16), and the current processing is terminated.

In addition, it is determined at regular time intervals in the ACC ECU 30 whether or not the preceding vehicle follow-up control is executed (S20). If it is determined in S20 that the preceding vehicle follow-up control is not executed, a stored deceleration value in the ACC ECU 30 is cleared, if there is any (S26), and the current processing is terminated.

If it is determined in S20 that the preceding vehicle follow-up control is executed, it is determined in the ACC ECU 30 whether or not the brakes are actuated on the basis of the brake pedal signal (S21). If it is determined in S21 that the brakes are actuated, the maximum deceleration value is stored in the ACC ECU 30 in a case that the maximum deceleration value is updated (S22), and the current processing is terminated.

If it is determined in S21 that the brakes are de-actuated, it is determined in the ACC ECU 30 whether or not the stored maximum deceleration value is larger than the threshold value D (S23). If it is determined in S23 that the maximum deceleration value is larger than the threshold value D, the stored deceleration value is cleared in the ACC ECU 30 (S26), and the current processing is terminated. In this case, the target following distance map, which is originally selected, is maintained.

If it is determined in S23 that the maximum deceleration value is equal to or smaller than the threshold value D, it is determined in the ACC ECU 30 whether or not the current following distance is larger than the threshold value B and smaller than the threshold value C (S24). If it is determined in S24 that the current following distance is equal to or smaller than the threshold value B or equal to or larger than the threshold value C, the stored deceleration value is cleared in the ACC ECU 30 (S26), and the current processing is terminated. In this case, the target following distance map, which is originally selected, is maintained.

If it is determined in S24 that the current following distance is larger than the threshold value B and smaller than the threshold value C, the target following distance map, which corresponds to the current following distance and the current subject vehicle speed, is selected in the ACC ECU 30 (S25). Then, the stored deceleration value is cleared in the ACC ECU 30 (S26), and the current processing is terminated.

According to the ACC system 1, when it is determined that the accelerator operation or the brake operation by the driver is not intended to adjust the target following distance, changing of the target following distance map is prohibited. Thus, the target following distance is not changed to the one that is unintended by the driver. Furthermore, according to the ACC system 1, when it is determined that the accelerator operation or the brake operation by the driver is intended to adjust the target following distance, the target following distance map is changed. Thus, the target following distance is changed to the one that is intended by the driver.

According to the ACC system 1, when the target following distance immediately after the completion of the accelerator operation or the brake operation by the driver is not within an appropriate range of the target following distance, changing of the target following distance map is prohibited. Thus, the target following distance is not changed to one that is unintended by the driver. Furthermore, according to the ACC system 1, when the target following distance immediately after the completion of the accelerator operation or the brake operation by the driver is within the appropriate range of the target following distance, the target following distance map is changed. Thus, the target following distance can be changed to the one in the appropriate range that is intended by the driver.

The embodiment of the present invention has been described so far. The present invention is not limited to the above embodiment and may be modified in various ways.

For example, the present invention is applied to the ACC system that executes the preceding vehicle follow-up control and the constant speed control in the embodiment; however, the present invention may be applied to a system that only executes the preceding vehicle follow-up control (following distance control).

In addition, the millimeter-wave radar is used to detect the preceding vehicle in the embodiment; however, another radar such as a laser-radar or another detecting means such as a stereo camera may be used.

A plurality of the ECUs are provided in this embodiment, and the engine control and the brake control are respectively executed by the engine control ECU and the brake control ECU. However, the ACC ECU may directly execute the engine control and the brake control.

When the maximum value of the accelerator operation amount exceeds the threshold value A, changing of the target following distance map is prohibited in the embodiment. However, the above determination may be made by using a parameter that indicates another accelerator operation amount, such as acceleration or a depressing speed of the accelerator pedal.

When the maximum deceleration value exceeds the threshold value D, changing of the target following distance map is prohibited in the embodiment. However, the above determination may be made by using a parameter that indicates another deceleration operation amount, such as a depressing amount of the brake pedal or a depressing speed of the brake pedal.

In the embodiment, it is determined whether or not changing of the target following distance map is prohibited on the basis of the determinations by the threshold value A for the maximum value of the accelerator operation amount and by the threshold value D for the maximum deceleration value. However, it may be determined whether or not changing of the target following distance map is prohibited on the basis of the determination either by the threshold value A or the threshold value D.

In the embodiment, when the maximum value of the accelerator operation amount is equal to or smaller than the threshold value A, or when the maximum deceleration amount is equal to or smaller than the threshold value D, it is determined whether or not the actual following distance is larger than the threshold value B and smaller than the threshold value C. Then, based on the above determination, it is determined whether or not changing of the target following distance map is prohibited. However, it may not have to be determined whether or not the actual following distance is larger than the threshold value B and smaller than the threshold value C. Apart from the determinations by the threshold value A for the maximum value of the accelerator operation amount and the threshold value D for the maximum deceleration value, it may be independently determined whether or not the actual following distance is larger than the threshold value B and smaller than the threshold value C. Then, it may be determined whether or not changing of the target following distance map is prohibited.

In this embodiment, when several conditions are met, changing of the target following distance map is prohibited. However, it may be configured to inhibit the changing amount of the target following distance such that the target following distance map may be changed to the one between the target following distance map, which is originally set, and the new target following distance map, which is selected on the basis of the following distance immediately after the completion of the operation. Thus, the changing amount of the target following distance after the given accelerator operation or the given brake operation may be set smaller than that during the normal control.

In the embodiment, the target following distance map that corresponds to the subject vehicle speed and the following distance is selected from the plural target following distance maps that are prepared in advance, and then the target following distance that corresponds to the subject vehicle speed is extracted from the selected target following distance map. However, instead of using the target following distance maps, the setting of the target following distance itself may be changed.

The invention claimed is:

1. A following distance control device that controls a vehicle to regulate a distance to a preceding vehicle to a target following distance, the following distance control device comprising:
    a detecting unit that detects at least one of an acceleration operation and a deceleration operation by a driver;
    a target following distance changing unit that changes the target following distance on the basis of the acceleration operation or the deceleration operation by the driver that is detected by the detecting unit, wherein after the completion of one of the acceleration operation and the deceleration operation the distance to the preceeding vehicle is regulated according to the target following distance changed by the target following distance changing unit; and
    an inhibition unit that inhibits a changing amount of the target following distance by the target following distance changing unit when a specified acceleration operation or a specified deceleration operation is executed.

2. The following distance control device according to claim 1, wherein the inhibition unit inhibits the changing amount of the target following distance by the target following distance changing unit when an acceleration operation amount that is detected by the detecting unit exceeds a threshold value of the acceleration operation amount or when a deceleration operation amount that is detected by the detecting unit exceeds a threshold value of the deceleration operation amount.

3. The following distance control device according to claim 1, wherein the inhibition unit inhibits the changing amount of the target following distance by the target following distance changing unit when the distance to the preceding vehicle after the acceleration operation or the deceleration operation by the driver that is detected by the detecting unit exceeds a maximum value of the following distance or falls below a minimum value of the following distance.

4. The following distance control device according to claim 1, wherein the inhibition unit prohibits changing of the target following distance by the target following distance changing unit.

5. The following distance control device according to claim 1, wherein the inhibition unit reduces the changing amount of the target following distance after the given acceleration operation or the given deceleration operation to be smaller than the changing amount of the target following distance during normal control.

6. A following distance control method for controlling a vehicle to regulate a distance to a preceding vehicle to a target following distance, the following distance control method comprising:

detecting at least one of acceleration operation and deceleration operation by a driver;

changing the target following distance on the basis of the detected acceleration operation or the detected deceleration operation by the driver, wherein after the completion of one of the acceleration operation and the deceleration operation the distance to the preceeding vehicle is regulated according to the changed target following distance; and     inhibiting a changing amount of the target following distance when a specified acceleration operation or a specified deceleration operation is executed.

* * * * *